(12) United States Patent
Hopper et al.

(10) Patent No.: US 6,780,229 B2
(45) Date of Patent: Aug. 24, 2004

(54) INKS

(75) Inventors: Alan John Hopper, Manchester (GB); William Albert Fern, Manchester (GB)

(73) Assignee: Avecia Limited, Manchester (GB)

( * ) Notice: Subject to any disclaimer, the term of this patent is extended or adjusted under 35 U.S.C. 154(b) by 135 days.

(21) Appl. No.: 10/203,207

(22) PCT Filed: Feb. 19, 2001

(86) PCT No.: PCT/GB01/00645
§ 371 (c)(1),
(2), (4) Date: Aug. 7, 2002

(87) PCT Pub. No.: WO01/62859
PCT Pub. Date: Aug. 30, 2001

(65) Prior Publication Data
US 2003/0116058 A1 Jun. 26, 2003

(30) Foreign Application Priority Data
Feb. 26, 2000 (GB) ............................................. 0004527

(51) Int. Cl.[7] .......................... C09D 11/00; C09D 11/02; B05D 1/26; B32B 27/14
(52) U.S. Cl. ............................... 106/31.43; 106/31.47; 106/31.49; 106/31.75; 106/31.77; 106/31.78; 427/466; 428/195.1
(58) Field of Search ........................... 106/31.43, 31.47, 106/31.49, 31.75, 31.77, 31.78; 427/466; 428/195.1

(56) References Cited

U.S. PATENT DOCUMENTS

| 3,103,504 A | 9/1963 | Horrobin .................... 534/576 |
| 4,472,168 A | 9/1984 | Gauthier ........................ 8/527 |
| 4,702,743 A * | 10/1987 | O'Callaghan et al. ......... 8/527 |
| 5,108,503 A | 4/1992 | Hindagolla et al. ...... 106/31.49 |
| 5,403,358 A | 4/1995 | Aston et al. .................... 8/445 |
| 5,431,722 A | 7/1995 | Yamashita et al. ........ 106/31.43 |
| 6,176,913 B1 | 1/2001 | Kasperchik et al. ..... 106/31.48 |
| 6,508,872 B2 * | 1/2003 | Nguyen et al. .......... 106/31.47 |

FOREIGN PATENT DOCUMENTS

JP  03/064370  * 3/1991

* cited by examiner

*Primary Examiner*—Helene Klemanski
(74) *Attorney, Agent, or Firm*—Morgan, Lewis & Bockius LLP

(57) ABSTRACT

A composition comprising:
a) 0.1 to 30 parts of colorant;
b) 0.1 to 20 parts of a compound of Formula (1):

$$R^1R^2N\text{—}Ar\text{—}(SO_3X)_n \qquad \text{Formula (1)}$$

wherein:
  $R^1$ is H, alkyl, cycloalkyl or aralkyl and $R^2$ is alkyl, cycloalkyl or aralkyl; or
  $R^1$ and $R^2$, together with the N atom to which they are attached, form a 5- or 6-membered ring;
  Ar is phenylene or naphthylene;
  X is H or a cation; and
  n is 1 or 2;
c) 1 to 40 parts of organic solvent;
d) 0 to 20 parts of hydrotropic agent;
e) 0 to 5 parts of biocide;
f) 0 to 5 parts of surfactant; and
g) 1 to 98.8 parts of water;
wherein all parts are by weight and a)+b)+c)+d)+e)+f)+g) add up to 100. Also claimed are inks comprising these compositions, ink jet printer cartridges containing these inks, their use in ink jet printing especially where the temperature of application is greater than 30° C. and substrates printed with these compositions or inks.

19 Claims, No Drawings

INKS

This invention relates to inks, to printing processes, to printed substrates and to ink-jet printer cartridges.

Ink-jet Printing ("IJP") is a non-impact printing technique in which droplets of ink are ejected through a fine nozzle onto a substrate without bringing the nozzle into contact with the substrate. There are many demanding performance requirements for inks used in IJP. For example they desirably provide sharp, non-feathered images having good water-fastness, light-fastness and optical density. The inks are often required to dry quickly when applied to a substrate to prevent smudging, but they should not form a crust over the tip of an inkjet nozzle because this will stop the printer from working. The inks should also be stable to storage over time without decomposing or forming a precipitate which could block the fine nozzle. Stability is a particular issue when jetting is performed at temperatures in excess of 30° C. where problems can arise, especially with regard to pH drift which in turn results in destabilisation of the ink formulation leading to problems such as crystallisation and colour shift.

Inks containing reactive dyes for use in textile ink-jet printing are known from U.S. Pat. No. 5,403,358. The inks are buffered to pH 5 to 8 using the sodium salt of metanilic acid (i.e. aniline-3-sulphonic acid) or an alkali metal phosphate.

According to a first aspect of the present invention there is provided a composition comprising:
a) 0.1 to 30 parts of colorant;
b) 0.1 to 20 parts of a compound of Formula (1):

wherein:
$R^1$ is H, alkyl, cycloalkyl or aralkyl and $R^2$ is alkyl, cycloalkyl or aralkyl; or
$R^1$ and $R^2$, together with the N atom to which they are attached, form a 5- or 6-membered ring;
Ar is phenylene or naphthylene;
X is H or a cation; and
n is 1 or 2;
c) 1 to 40 parts of organic solvent;
d) 0 to 20 parts of hydrotropic agent;
e) 0 to 5 parts of biocide;
f) 0 to 5 parts of surfactant; and
g) 1 to 98.8 parts of water;
wherein all parts are by weight and a)+b)+c)+d)+e)+f)+g) add up to 100.

a) The Colorant

Preferably the colorant comprises a dye. Preferred dyes are azo, anthraquinone, pyrroline, phthalocyanine, polymethine, aryl-carbonium, triphenodioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, nigrosine, oxazine, thiazine, indigoid quinonioid, quinacridone, lactone, pyrroline, benzodifuranone, or indolene dyes and mixtures thereof. Preferred azo dyes are monoazo, disazo and trisazo dyes.

Preferably the dye is a reactive dye, more preferably a dye having a reactive group selected from halotriazine (especially mono- or di-chloro or fluorotriazine), vinyl sulphone, groups convertible to vinyl sulphone on treatment with aqueous alkali (especially β-sulphatoethyl sulphonyl) and halo pyrimidine (especially 1,3,4-trichloro pyrimidin-2-yl, 1,3-difluoro4-chloropyrimidin-2-yl and 1-(SO₂CH₃)-3-methyl-4-chloropyrimidin-2-yl).

Examples of reactive dyes include C.I. Reactive Black 1, 2, 3, 4, 5, 6, 7, 8, 9, 19, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47; C.I. Reactive Blue 1, 2, 3, 4, 5, 6, 7, 8, 9, 19, 11, 12, 13, 14, 15, 15.1, 16, 17, 18, 19, 19.2, 20, 21, 22, 23, 24, 25, 26, 27, 28, 29, 30, 31, 32, 33, 34, 35, 36, 36.1, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 118.1, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 171.1, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256; C.I. Reactive Brown 1, 2, 3, 4, 5, 6, 7, 8, 9, 19, 11, 12, 13, 14, 15, 16, 16.1, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48; C.I. Reactive Green 1, 2, 3, 4, 5, 6, 7, 8, 9, 19, 11, 12, 13, 14, 15, 16, 17, 18, 19, 20, 21, 22, 23, 24, 25, 26, 27, 28, 29, 30; C.I. Reactive Orange 1, 2, 3, 4, 5, 6, 7, 8, 9, 19, 11, 12, 13, 14, 15, 15.1, 16, 16.1, 16.2, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72.1, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 118.1, 119, 120, 121, 122, 123, 124, 125, 126, 127; C.I. Reactive Red 1, 1.1, 2, 3, 3.1, 4, 5, 6, 6.1, 7, 8, 8.1, 9, 10, 11, 12, 13, 14, 15, 16, 17, 18, 19, 20, 21, 21.1, 22, 22.1, 23, 24, 24.1, 25, 26, 27, 28, 29, 30, 31, 31.1, 32, 33, 34, 35, 35.1, 35.2, 36, 37, 38, 39, 40, 41, 42, 43, 44, 45, 45.1, 46, 47, 48, 49, 50, 51, 51.1, 52, 53, 54, 55, 56, 57, 58, 59, 60, 60.1, 61, 61.1, 62, 63, 63.1, 64, 65, 66, 67, 68, 69, 70, 71, 72, 73, 73.1, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 106.1, 107, 108, 109, 110, 111, 112, 113, 114, 115, 116, 117, 118, 118.1, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 171.1, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262; C.I. Reactive Violet 1, 2, 3, 4, 5, 6, 7, 8, 9, 19, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46; C.I. Reactive Yellow 1, 2, 3, 4, 5, 6, 7, 8, 9, 19, 11, 12, 13, 14, 15, 15.1, 16, 17, 18, 19, 20, 21, 22, 23, 24, 24.1, 25, 26, 27, 28, 29, 30, 31, 32, 33, 34, 35, 36, 36.1, 37, 37.1, 38, 39, 40, 41, 42, 42.1, 43, 44, 45, 45.1, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 118.1, 119, 120, 121, 122, 123, 124, 125, 126, 127, 128, 129, 130, 131, 132, 133, 134, 135, 136, 137, 138, 138.1, 139, 140, 141, 142, 143, 144, 145, 146, 147, 148, 149, 150, 151, 152, 153, 154, 155, 156, 157, 158, 159, 160, 161, 162, 16.3, 164, 165, 166, 167, 168, 169, 170, 171, 171.1, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202; or a mixture comprising two or more dyes).

Preferably component a) is present in an amount of 1 to 15, more preferably 2 to 10 parts of the composition. Component a) may be a single component or a combination of components, e.g. a mixture of 2, 3 or 4 dyes.

b) The Compounds of Formula (1)

Preferably $R^1$ and $R^2$ are each independently alkyl, or $R^1$ and $R^2$ together with the N atom to which they are attached from a 5- or 6-membered ring. More preferably $R^1$ and $R^2$ are each independently $C_{1-6}$-alkyl, especially ethyl.

When $R^1$ and $R^2$ together with the N atom to which they are attached form a 5- or 6-membered ring, the ring is preferably an optionally substituted morpholine, piperazine or piperidine. Preferred optional substituents are carboxy and sulpho.

Preferably the total number of carbon atoms in $R^1$ and $R^2$ added together is from 3 to 18, more preferably 3 to 12, especially 3 to 6.

Ar is preferably phenylene.

X is preferably a cation, more preferably an alkali metal (especially $Na^+$, $K^+$ or $Li^+$), ammonium or substituted ammonium cation.

Examples of compounds of Formula (1) include 4-chloro-N:N-diethylaniline sulphonic acid, N:N-di-n-hexylaniline-3-sulphonic acid, N-ethyl-N-n-hexylaniline disulphonic acids, 2-N:N-diethylaminonaphthalene-6-sulphonic acid, 2-(N-ethyl-N-benzylamino)-toluene-4-sulphonic acid, 2-N:N-diethylaminotoluene-4-sulphonic acid, N-ethyl-N-cyclohexylaniline-sulphonic acid, N-ethyl-N-betahydroxyethylaniline-sulphonic acid, N-ethyl-N-phenylbenzylaminomonosulphonic acid, 2-(N-ethyl-N-phenylamino)-ethanesulphonic acid, 2-(N-butyl-N-phenylamino)ethanesulphonic acid and 4:4'bis (diethylamino)diphenyl-2:2'-disulphonic acid. Because of their ease of manufacture and efficiency as buffers, the preferred compounds of Formula (1) are the lower N:N-dialkyl-derivatives of metanilic acid (aniline 3-sulphonic acid) and sulphanilic acid (aniline 4-sulphonic acid) especially N:N-diethylmetanilic acid, N:N-diethylsulphanilic acid, or the mixture of the two obtained by the sulphonation of diethylaniline with oleum. N:N-diethylsulphanilic acid is also known as N:N-diethyl-3-sulphoaminobenzene or DEAS.

Preferably the compound of Formula (1) is present in an amount of 0.2 to 10, more preferably 0.2 to 5, especially 0.2 to 1 parts of the composition.

Preferably the compound of Formula (1) is a buffer, especially a buffer which maintains the pH of the composition between pH 4 to 8.

c) The Organic Solvent

The weight ratio of component g) to c) is preferably 99:1 to 1:99, more preferably 99:1 to 50:50 and especially 95:5 to 75:25.

The organic solvent is preferably a water-miscible organic solvent or a mixture comprising such solvents. Preferred water-miscible organic solvents include alkanols such as the $C_{1-6}$-alkanols, preferably methanol, ethanol, n-propanol, isopropanol, n-butanol, sec-butanol, tert-butanol, n-pentanol, cyclopentanol, cyclohexanol and hydroxyethylmorpholine; linear amides, preferably dimethylformamide or dimethylacetamide; ketones and ketone-alcohols, preferably acetone, methyl ether ketone, cyclohexanone and diacetone alcohol; water-miscible ethers; preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, propylene glycol, thiodiglycol, diethyleneglycol and triethyleneglycol; mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol; and triols especially glycerol.

Preferably component c) is present in an amount of 2 to 30 parts, more preferably 5 to 25 parts of the composition.

d) The Hydrotropic Agent

Preferably a hydrotropic agent is present in the composition because such agents help to increase storage stability.

Preferably hydrotropic agents are anionic, cationic, or non-ionic in nature.

Examples of anionic hydrotropic agents which may be used in the practice of the invention include salts of benzoic acid, salicylic acid, benzene disulphonic acid, toluene sulphonic acid, xylene sulphonic acid, cymene-sulphonic acid, cinnamic acid, octane sulphonic acid, hexane sulphonic acid, butane sulphonic acid and decane sulphonic acid. The cation associated with these salts is preferably $Na^+$, $K^+$, $Li^+$ or $NH_4^+$.

Examples of suitable cationic hydrotropic agents include, urea, nicotinamide, guanidine hydrochloride, p-amino benzoic acid hydrochloride, procaine hydrochloride, caffeine and salts of alkylpyridium, alkyltrimethyl ammonium, benzyltrialkyl (C1 to C4) ammonium, and phenyltrimethyl ammonium cations. The anion associated with these salts is preferably any of the halides, particularly $Cl^-$.

Examples of non-ionic hydrotropic agents include, Beta-napthalene ethoxylates, caprolactam derivatives, resorcinol and pyrogallol.

Preferably the hydrotropic agent is a nicotinamide or urea. More preferably the hydrotropic agent is a urea.

Preferably component d) is present in an amount of 0.5 to 20 parts of the composition.

e) The Biocide

Preferably a biocide is present in the composition because this prevents microbial spoilage during manufacture, storage and use. Examples of biocides include: isothiazolin-3-ones such as 4,5-trimethylene-4-isothiazolin-3-one, 2-methyl-4,5-trimethylene-4-isothiozolin-3-one, 2-methylisothiazolin- 3-one, 5-chloro-2-methylisothiazolin-3-one, 2-octylisothiazolin-3-one, 4,5-dichloro-2-octyltisothiazolin-3-one, benzisothiazolin-3-one, 2-butylbenzisothiazolin-3-one and 2-methylbenzisothiazolin-3-one; thiazole derivatives such as 2-(thiocyanomethylthio)-benzthiazole and mercaptobenzthiazole; nitro compounds such as tris (hydroxymethyl)nitromethane, 5-bromo-5-nitro-1,3-dioxane and 2-bromo-2-nitropropane-1,3-diol; aldehydes and derivatives such as gluteraldehyde (pentanedial), p-chlorophenyl-3-iodopropargyl formaldehyde and glyoxal; guanidine derivatives such as polyhexamethylenebisbiguanide and 1,6-hexamethylene-bis[5-(4-chlorophenyl) biguanide]; thiones such as 3,5-dimethyltetrahydro-1,3,5-2H-thiodiazine-2-thione; triazine derivatives such as hexahydrotriazine and 1,3,5-tri-(hydroxyethyl)-1,3,5-hexahydrotriazine; oxazolidine and derivatives thereof such as bis-oxazolidine; furan and derivatives thereof such as 2,5-dihydro-2,5-dialkoxy-2,5-dialkylfuran; carboxylic acids and the salts and esters thereof such as sorbic acid and the salts thereof and 4-hydroxybenzoic acid and the salts and esters thereof; phenol and derivatives thereof such as 5-chloro-2-(2,4-dichlorophenoxy)phenol, thio-bis(4-chlorophenol) and 2-phenylphenol. The biocides may be used singly. Alternatively, two or more biocides may be used in combination. Preferably the biocide is an isothiazolinone more preferably it is a benzisothiazolinone. It is especially preferred that the biocide is benzisothiazolin-3-one.

Preferably component d) is present in an amount of 0.001 to 5 parts, more preferably 0.01 to 0.5 parts of the composition.

f) The Surfactant

Preferably a surfactant is present in the composition. In addition to stabilising the composition surfactants can also shorten the drying time for the composition and enhance penetration into the substrate.

Preferred surfactants are non-ionic, anionic, cationic or amphoteric.

Examples of non-ionic surfactants include polyoxyethylene nonyl phenyl ether, polyoxyethylene octyl phenyl ether, polyoxyethylene dodecyl phenyl ether, polyoxyethylene alkyl ethers, polyoxyethylene polyoxypropylene block copolymers, polyoxyethylene fatty acid esters, sorbitan fatty acid esters, polyoxyethylene sorbitan fatty acid esters, fatty acid alkylolamides, acetylenic diols and the like.

Examples of anionic surfactants include alkylbenzenesulphonates, alkylphenylsulphonates, alkylnaphthalenesulphonates, formalin condensates of naphthalenesulphonates, higher fatty acid salts, sulphuric ester salts of higher fatty acid esters, sulphonates of higher fatty acid esters, sulphuric acid esters and sulphonates of higher alcohol ethers, alkylcarboxylates of higher alkylsulphonamides, sulphosuccinates and sulphosuccinic acid ester salts.

Examples of cationic surfactants include primary, secondary and tertiary amine salts, quaternary ammonium salts and the like.

Examples of amphoteric surfactants include betaine, sulphobetaine, sulphate betaine and the like.

The surfactants may be used singly or two or more surfactants may be used in combination.

Preferably the surfactant comprises an acetylinic diol, e.g. a Surfynol™ surfactant.

Preferably component f) is present in an amount of 1 to 5 parts of the composition.

General

Preferably the composition has been filtered through a filter having a mean pore size below 10 µm, more preferably below 2 µm, especially below 1 µm, more especially below 0.45 µm. This filtration removes particulate matter which could otherwise block the fine nozzles found in many ink-jet printers.

The composition preferably has a total concentration of divalent metal ions and trivalent metal ions, other than those bound to the dye, below 1000, more preferably below 100, especially below 20, more especially below 10 parts per million by weight relative to the total weight of ink. Pure composition of this type may be prepared by using high purity ingredients and/or by purifying the composition after it has been prepared. Suitable purification techniques include ultrafiltration, reverse osmosis, ion exchange and combinations thereof.

In view of preferences outlined above the preferred composition comprises:
a) 1 to 15 parts of a reactive dye;
b) 0.2 to 5 parts of a compound of Formula (1) as hereinbefore defined;
c) 5 to 25 parts of organic solvent;
d) 0.5 to 20 parts of hydrotropic agent;
e) 0.001 to 5 parts of biocide;
f) 0.1 to 5 parts of surfactant; and
g) 25 to 92.199 parts of water;
wherein all parts are by weight and a)+b)+c)+d)+e)+f)+g) add up to 100.

The compositions may be used directly as inks, especially inks for ink-jet printers, or as concentrates for the preparation of inks.

The compositions and inks of the invention may of course contain further ingredients in addition to components a) to g) mentioned above, for example anti-kogation agents, stabilisers, antioxidants etc.

According to a second feature of the present invention there is provided a process for forming an image on a substrate comprising applying thereto a composition according to the first aspect of the present invention by means of an ink-jet printer.

The ink-jet printer preferably applies the composition to the substrate in the form of droplets which are ejected through a small orifice onto the substrate. Preferred ink-jet printers are piezoelectric ink-jet printers and thermal ink-jet printers. In thermal ink-jet printers, programmed pulses of heat are applied to the composition in a reservoir by means of a resistor adjacent to the orifice, thereby causing the composition to be ejected in the form of small droplets directed towards the substrate during relative movement between the substrate and the orifice. In piezoelectric ink-jet printers the oscillation of a small crystal causes ejection of the composition from the orifice. In WO 00/48938 and WO 00/55089 an ink-jet technology is described where ink is ejected from an ink ejection nozzle chamber utilising an electromechanical actuator connected to a paddle or plunger which moves towards the ejection nozzle of the chamber for the ejection of drops of ink from the ejection nozzle chamber.

Preferably the composition is applied at a temperature in excess of 30° C.

The substrate is preferably paper, plastic, metal or glass, more preferably a textile material.

The textile material may be of natural or synthetic fibres including blends thereof. Thus, it may be cellulose, including viscose rayon and regenerated viscose rayon, wool, acrylic, polyamide such as nylon, polyester such as polyethyleneglycolterephthalate or polyurethane. It is, however, preferably cellulose or a blend thereof.

The textile material is preferably woven or knitted or in the form of dry or wet laid fibres. It may be in the form of sheets, webs, threads or ready made up garments such as drapes, shirting, toweling, underwear, socks and sheeting.

Preferably the textile material has been impregnated with a composition comprising 5% to 50% of a colour enhancing agent, 1% to 5% alkali metal hydroxide, carbonate, bicarbonate or a mixture thereof, 10% to 20% alginate thickener and the balance water, wherein all percentages are by weight relative to the weight of the composition.

A preferred colour enhancing agent is as described in U.S. Pat. No. 5,403,358, claim 1, which is incorporated herein by reference thereto.

A third aspect of the present invention provides a paper, an overhead projector slide or a textile material printed with a composition or by means of a process according to the present invention.

A fourth aspect of the present invention provides an ink-jet printer cartridge comprising a chamber and an composition, wherein the composition is present in the chamber and is as defined in the first aspect of the present invention as hereinbefore described.

The invention is further illustrated by the following Examples in which all parts and percentages are by weight unless otherwise stated.

EXAMPLES 1 TO 17

Preparation of Inks

The inks described in Tables I, II and III were prepared. Numbers quoted refer to the percentage of the relevant ingredient by weight. All inks were made up to 100% with water.

The following colorants were used:
C.I. Reactive Yellow 85
C.I. Reactive Orange 13
C.I. Reactive Red 3.1
C.I. Reactive Red 31
C.I. Reactive Blue 71
C.I. Reactive Blue 49
C.I. Reactive Black 8
Pro-Jet™ Black R-TX
Dye 9—A yellow dye of the following structure;

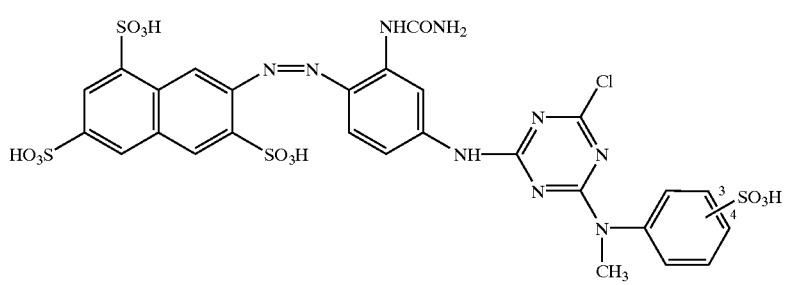

Dye 10—A red dye of the following structure;

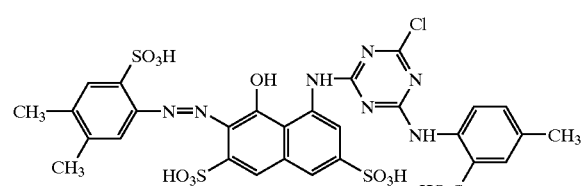

All dyes were obtained from Avecia Limited apart from C.I. Reactive Blue 49 which was obtained from Atul Ltd. Dyes 9 and 10 do not yet have C.I. designations. "Pro-Jet" is a trade mark of Avecia Ltd.

Abbreviations used are:
DEG=diethylene glycol
PEG=polyethylene glycol
DEAS=N:N-diethylsulphanilic acid Surfynol 465™ is a surfactant comprising an acetylinic diol obtainable from Air Products Ltd, Solsperse™ 2700 is a Beta-napthol ethoxylate dispersant obtainable from Avecia Ltd. Proxel™ GXL, is a biocide containing benzisothiazolin-3-one as the active agent also obtained from Avecia Ltd. "Surfynol" is a trade mark of Air Products Ltd and "Solsperse" and "Proxel" are trade marks of Avecia Ltd.

TABLE I

|  | Ink 1 | Ink 2 | Ink 3 | Ink 4 | Ink 5 | Ink 6 |
|---|---|---|---|---|---|---|
| C.I. Reactive Yellow 85 | 10.0% | — | — | — | — | — |
| Dye 10 | — | 10.0% | — | — | — | — |
| C.I. Reactive Blue 71 | — | — | 8.5% | 8.5% | — | — |
| Pro-Jet Black R-TX | — | — | — | — | 12.0% | 12.0% |
| DEG | 4.0% | 4.0% | 5.0% | 5.0 | 15.0% | 12.5% |
| PEG 200 | 15.0% | 13.5% | — | — | — | — |
| Glycerol | 1.0% | 1.0% | — | 1.0% | 1.0% | 1.0% |
| DEAS | 0.5% | 0.5% | 0.5% | 0.5% | 0.5% | 0.5% |
| Proxel GXL | 0.1% | 0.1% | 0.1% | 0.1% | 0.1% | 0.1% |
| Surfynol 475 | 1.0% | 1.0% | 1.0% | 1.0% | 1.0% | 1.0% |
| Solsperse 2700 | — | — | 1.0% | — | — | — |

TABLE II

|  | Ink 7 | Ink 8 | Ink 9 | Ink 10 | Ink 11 |
|---|---|---|---|---|---|
| Dye 9 | 10.0% | — | — | — | — |
| C.I. Reactive Orange 13 | — | 10.0% | — | — | — |
| C.I. Reactive Red 3.1 | — | — | 10.0% | — | — |
| C.I. Reactive Blue 71 | — | — | — | 10.0% | — |
| C.I. Reactive Blue 49 | — | — | — | — | 10.0% |
| PEG 200 | 15.0% | 15.5% | — | — | 1.2% |
| DEG | 4.0% | 4.0% | 9.0% | 13.0% | 4.0% |
| Glycerol | 1.0% | 1.0% | 1.0% | 1.0% | 1.0% |
| Urea | 5.0% | 5.0% | 5.0% | 5.0% | 5.0% |
| DEAS | 0.5% | 0.5% | 0.5% | 0.5% | 0.5% |
| Surfynol 475 | 1.0% | 1.0% | 2.0% | 1.0% | 2.0% |
| Proxel GXL | 0.1% | 0.1% | 0.1% | 0.1% | 0.1% |

TABLE III

|  | Ink 12 | Ink 13 | Ink 14 | Ink 15 | Ink 16 | Ink 17 |
|---|---|---|---|---|---|---|
| C.I. Reactive Red 31 | 3.0% | — | — | 8.0% | — | — |
| Pro-Jet Black R-TX | — | 3.0% | — | — | — | — |
| C.I. Reactive Yellow 85 | — | — | 10.0% | — | — | — |

TABLE III-continued

|  | Ink 12 | Ink 13 | Ink 14 | Ink 15 | Ink 16 | Ink 17 |
|---|---|---|---|---|---|---|
| C.I. Reactive Blue 71 | — | — | — | — | 8.0% | — |
| C.I. Reactive Black 8 | — | — | — | — | — | 10.0% |
| DEG | 4.0% | 4.0% | 4.0% | 4.0% | 4.0% | 4.0% |
| PEG 200 | 4.0% | 4.0% | 4.0% | 4.0% | 4.0% | 4.0% |
| Glycerol | 1.0% | 1.0% | 1.0% | 1.0% | 1.0% | 1.0% |
| Urea | 5.0% | — | — | — | — | — |
| DEAS | 0.5% | 0.5% | 0.5% | 0.5% | 0.5% | 0.5% |
| Proxel GXL | 0.1% | 0.1% | 0.1% | 0.1% | 0.1% | 0.1% |

EXAMPLE 18 AND COMPARATIVE EXAMPLES A TO K

Stability of an Ink Prepared with Various Buffers

A number of inks were prepared containing either no buffer (Ink A) DEAS of Formula (1) (Ink 18) or one of a variety of alternative compounds not of Formula (1) (Inks B to K).

The abbreviations used in Example 18 and Comparative Inks B to K are:
PA=Phytic Acid
DEAS=N:N-diethylsulphanilic acid
TRIS=tris(hydroxymethyl)aminomethane
HEPES=4-(2-hydroxyethyl)-1-piperazineethanesulphonic acid
TES=2-[{tris(hydroxymethyl)-methyl}amino]-1-ethanesulphonic acid
MOPS=4-morpholinepropanesulphonic acid
BES=N,N-bis(2-hydroxyethyl)-2-aminoethanesulphonic acid
BIS-TRIS=2,2-bis(hydroxymethyl)-2,2',2"-nitrilotriethanol
MOPSO=Beta-hydroxy-4-morpholinepropanesulphonic acid
PIPES=1,4-piperazinebis(ethanesulphonic acid)
HEPPSO=Beta-hydroxy-4-(2-hydroxyethyl)-1-piperazinepropanesulphonic acid monohydrate The ink formulations are shown in Table IV wherein all inks were made up to 100% with water.

The inks were then assessed for their pH stability following storage for 1 week at 80° C. Results are shown in Table V.

TABLE IV

|  | Ink 18 | Ink A | Ink B | Ink C | Ink D | Ink E | Ink F | Ink G | Ink H | Ink I | Ink J | Ink K |
|---|---|---|---|---|---|---|---|---|---|---|---|---|
| Dye 10 | 10% | 10% | 10% | 10% | 10% | 10% | 10% | 10% | 10% | 10% | 10% | 10% |
| DEG | 4% | 4% | 4% | 4% | 4% | 4% | 4% | 4% | 4% | 4% | 4% | 4% |
| PEG 200 | 4% | 4% | 4% | 4% | 4% | 4% | 4% | 4% | 4% | 4% | 4% | 4% |
| Glycerol | 1% | 1% | 1% | 1% | 1% | 1% | 1% | 1% | 1% | 1% | 1% | 1% |
| PA | — | — | 0.5% | — | — | — | — | — | — | — | — | — |
| DEAS | 0.5% | — | — | — | — | — | — | — | — | — | — | — |
| TRIS | — | — | — | 0.5% | — | — | — | — | — | — | — | — |
| HEPES | — | — | — | — | 0.5% | — | — | — | — | — | — | — |
| TES | — | — | — | — | — | 0.5% | — | — | — | — | — | — |
| MOPS | — | — | — | — | — | — | 0.5% | — | — | — | — | — |
| BES | — | — | — | — | — | — | — | 0.5% | — | — | — | — |
| BIS-TRIS | — | — | — | — | — | — | — | — | 0.5% | — | — | — |
| MOPSO | — | — | — | — | — | — | — | — | — | 0.5% | — | — |
| PIPES | — | — | — | — | — | — | — | — | — | — | 0.5% | — |
| HEPPSO | — | — | — | — | — | — | — | — | — | — | — | 0.5% |

TABLE V

| Ink | pH (t = 0) | pH (t = 1 week @80° C.) | pH change |
|---|---|---|---|
| Ink 18 | 7.34 | 7.45 | +0.11 |
| Ink A | 7.35 | 8.08 | +0.73 |
| Ink B | 7.30 | 7.81 | +0.51 |
| Ink C | 7.08 | 7.56 | +0.48 |
| Ink D | 7.09 | 7.74 | +0.65 |
| Ink E | 7.20 | 7.61 | +0.41 |
| Ink F | 7.16 | 7.65 | +0.49 |
| Ink G | 7.26 | 7.56 | +0.30 |
| Ink H | 7.10 | 7.72 | +0.62 |
| Ink I | 7.23 | 7.62 | +0.39 |
| Ink J | 7.32 | 7.68 | +0.36 |
| Ink K | 7.24 | 7.55 | +0.31 |

Ink 18 which contains DEAS (a compound of Formula (1)) shows significantly less pH drift than any of the other inks lacking this compound or containing alternative buffers. This decreased tendency towards pH drift provides enhanced stability of the formulation and less problems with crystallisation and colour shift.

EXAMPLES 19 TO 23 AND COMPARATIVE EXAMPLE L

The inks described in Tables VI were prepared. Numbers quoted refer to the percentage of the relevant ingredient by weight. All inks were made up to 100% with water.
Abbreviations used are:
DEG=diethylene glycol
PEG=polyethylene glycol
DEAS=N:N-diethylsulphanilic acid
Proxel™ GXL, is a biocide containing benzisothiazolin-3-one as the active agent obtained from Avecia Ltd. "Proxel" and "Pro-Jet" are trade marks of Avecia Ltd.

TABLE VI

|  | Ink 19 | Ink 20 | Ink 21 | Ink 22 | Ink 23 |
|---|---|---|---|---|---|
| Reactive Yellow 85 | 10.0% | | | | |
| Pro-Jet Magenta 2B-TX | | 10.0% | | | |
| Pro-Jet Yellow JP-XR | | | 10.0% | | |
| Reactive Orange 13 | | | | 10.0% | |
| Reactive Red 3.1 | | | | | 10.0% |
| DEG | 4.0% | 4.0% | 4.0% | 4.0% | 9% |
| PEG 200 | 15.0% | 13.5% | 15.0% | 15.5% | |
| Glycerol | 1.0% | 1.0% | 1.0% | 1.0% | 1.0% |
| Urea | | | 5.0% | 9.0% | 5.0% |
| DEAS | 0.5% | 0.5% | 0.5% | 0.5% | 0.5% |
| Proxel GXL | 0.1% | 0.1% | 0.1% | 0.1% | 0.1% |
| Water | to 100% | to 100% | to 100% | to 100% | to 100% |

TABLE VII

|  | Comparative Ink L |
|---|---|
| Reactive Orange 13 | 12% |
| Reactive Blue 49 | |
| Reactive Blue 72 | |
| Propylene glycol | 20% |
| Water | to 100% |

These inks were evaluated using the following tests:

Dry Out Test:

A 5 g sample of ink was placed in a shallow petrie dish measuring about 50 mm in diameter. The dish was then loosely covered so as to allow free circulation of air around the sample but prevent contamination with dust etc. The sample was allowed to stand at room temperature (approximately 20° C.) for 72 hrs. At the end of this period, the sample was sealed to prevent any further drying out. The appearance of the sample was noted (eg whether or not it was still fluid, skin formation, appearance of solids). The sample was also examined under a microscope and the presence of any solid material was noted. Results are shown in Table VIII.

TABLE VIII

| Ink | Results of the dry out test |
|---|---|
| Ink 19 | Very Fluid. No solids |
| Ink 20 | Very Fluid. No solids |
| Ink 21 | Very Fluid. No solids |
| Ink 22 | Thick but fluid. No solids |
| Ink 23 | Very Fluid. No solids |
| Comparative Ink L | Very thick liquid with surface skin. Amorphous solid present |

Further Inks

The inks described in Tables IX and X may be prepared wherein each ink is made up to 100% with water. The inks may be applied by thermal or piezo ink-jet printing.

The following abbreviations are used in Tables IX and X:

BC=butyl cellusolve

DEAS=N:N-diethylsulphanilic acid

DEG=diethylene glycol

2P=2-pyrollidone.

Surfynol 465™ is a surfactant comprising an acetylinic diol obtainable from Air Products Ltd, Proxel™ GXL, is a biocide containing benzisothiazolin-3-one as the active agent also obtained from Avecia Ltd. "Surfynol" is a trade mark of Air Products Ltd and "Proxel" and "Pro-Jet" are trade marks of Avecia Ltd.

TABLE IX

|  | Ink 24 | Ink 25 | Ink 26 | Ink 27 | Ink 28 | Ink 29 | Ink 30 | Ink 31 | Ink 32 | Ink 33 | Ink 34 |
|---|---|---|---|---|---|---|---|---|---|---|---|
| Pro-Jet Yellow JP - XR | 10% | | | | | | | | | | |
| Pro-Jet Red 2B - TX | | 10% | | | | | | | | 2% | |
| C I Reactive Blue 15 | | | 10% | | | | | | 2% | | |
| C I Reactive Blue 49 | | | | 10% | | | | | | | |
| C I Reactive Yellow 85 | | | | | 10% | | | | | | 1.1% |
| C I Reactive Orange 13 | | | | | | 10% | | | | | |
| C I Reactive Red 3.1 | | | | | | | 10% | | | | 0.54% |
| Pro-Jet Black PX - 2R | | | | | | | | 12.5% | | | 2.0% |
| Ethylene glycol | | | | | | | | 8.5% | | | |
| DEG | 10% | 8% | 10% | 9% | 10% | 10% | 7% | | 15% | 14% | 15% |
| Glycerol | | | 1% | | | | | 1% | 3% | 3% | 1% |
| 2P | 10% | 8% | 10% | 9% | 10% | 10% | | | 15% | 14% | 15% |
| BC | 2% | 2% | 5% | 2% | 2% | 2% | 2% | 2% | 5% | 5% | 2% |
| Surfynol 465 | 1% | 1% | 1% | | 1% | 1% | 1% | 1% | 1% | 1% | 1% |
| Urea | 5% | 5% | 5% | 5% | 5% | 5% | 5% | 5% | 5% | 5% | 5% |
| DEAS (50%) | 0.5% | 0.5% | 0.5% | 0.5% | 0.5% | 0.5% | 0.5% | 0.5% | 0.5% | 0.5% | 0.5% |
| Proxel GXL | 0.1% | 0.1% | 0.1% | 0.1% | 0.1% | 0.1% | 0.1% | 0.1% | 0.1% | 0.1% | 0.1% |

TABLE X

|  | Ink 35 | Ink 36 | Ink 37 | Ink 38 | Ink 39 | Ink 40 | Ink 41 | Ink 42 | Ink 43 | Ink 44 | Ink 45 |
|---|---|---|---|---|---|---|---|---|---|---|---|
| Pro-Jet Yellow JP - XR | 10% | | | | | | | | | | |
| Pro-Jet Red 2B - TX | | 10% | | | | | | | | 2% | |
| C I Reactive Blue 15 | | | 10% | | | | | | 2% | | |
| C I Reactive Blue 49 | | | | 10% | | | | | | | |

TABLE X-continued

|  | Ink 35 | Ink 36 | Ink 37 | Ink 38 | Ink 39 | Ink 40 | Ink 41 | Ink 42 | Ink 43 | Ink 44 | Ink 45 |
|---|---|---|---|---|---|---|---|---|---|---|---|
| C I Reactive Yellow 85 |  |  |  |  | 10% |  |  |  |  |  | 1.1% |
| C I Reactive Orange 13 |  |  |  |  |  | 10% |  |  |  |  |  |
| C I Reactive Red 3.1 |  |  |  |  |  |  | 10% |  |  |  | 0.54 |
| Pro-Jet Black PX - 2R |  |  |  |  |  |  |  | 12.5% |  |  | 2.0% |
| Propylene glycol | 9% | 10% | 10% | 8% | 10% | 10% | 4% | 6% | 14% | 13% | 14% |
| Glycerol |  |  | 1% |  |  |  |  | 1% | 3% | 3% | 1% |
| 2P | 9% | 10% | 10% | 8% | 10% | 10% | 4% |  | 14% | 13% | 14% |
| BC | 2% | 2% | 5% | 2% | 2% | 2% | 2% | 2% | 5% | 5% | 2% |
| Surfynol 465 | 1% | 1% | 1% |  | 1% | 1% | 1% | 1% | 1% | 1% | 1% |
| Urea | 5% | 5% | 5% | 5% | 5% | 5% | 5% | 5% | 5% | 5% | 5% |
| DBAS (50%) | 0.5% | 0.5% | 0.5% | 0.5% | 0.5% | 0.5% | 0.5% | 0.5% | 0.5% | 0.5% | 0.5% |
| Proxel GXL | 0.1% | 0.1% | 0.1% | 0.1% | 0.1% | 0.1% | 0.1% | 0.1% | 0.1% | 0.1% | 0.1% |

What is claimed is:

1. A composition comprising:
   a) 0.1 to 30 parts of colorant;
   b) 0.1 to 20 parts of a compound of Formula (1):

$$R^1R^2N\text{—}Ar\text{—}(SO_3X)_n \qquad \text{Formula (1)}$$

wherein:
   $R^1$ is H, alkyl, cycloalkyl or aralkyl and $R^2$ is alkyl, cycloalkyl or aralkyl; or
   $R^1$ and $R^2$, together with the N atom to which they are attached, form a 5- or 6-membered ring;
   Ar is phenylene or naphthylene;
   X is H or a cation; and
   n is 1 or 2;
   c) 1 to 40 parts of organic solvent;
   d) 0 to 20 parts of hydrotropic agent;
   e) 0 to 5 parts of biocide;
   f) 0 to 5 parts of surfactant; and
   g) 1 to 98.8 parts of water;
   wherein all parts are by weight and a)+b)+c)+d)+e)+f)+g) add up to 100.

2. A composition according to claim 1 wherein component b) comprises N:N-diethylsulphanilic acid.

3. A composition according to any one of the previous claims wherein component a) comprises a dye.

4. A composition according to claim 1 wherein component a) comprises a reactive dye.

5. A composition according to claim 1 wherein component d) comprises a urea.

6. A composition according to claim 1 wherein component e) comprises an isothiazolinone.

7. A composition according to claim 1 wherein component f) comprises an acetylenic diol.

8. A composition according to claim 1 wherein component a) is present in an amount of 1 to 15 parts.

9. A composition according to claim 1 wherein component b) is present in an amount of 0.2 to 5 parts.

10. A composition according to claim 1 wherein component c) is present in an amount of 5 to 25 parts.

11. A composition according to claim 1 wherein component d) is present in an amount of 0.5 to 20 parts.

12. A composition according to claim 1 wherein component e) is present in an amount of 0.001 to 5 parts.

13. A composition according to claim 1 wherein component f) is present in an amount of 0.1 to 5 parts.

14. A composition according to claim 1 comprising:
   a) 1 to 15 parts of a reactive dye;
   b) 0.2 to 5 parts of a compound of Formula (1);
   c) 5 to 25 parts of organic solvent;
   d) 0.5 to 20 parts of hydrotropic agent;
   e) 0.001 to 5 parts of biocide;
   f) 0.1 to 5 parts of surfactant; and
   g) 25 to 92.199 parts of water;
   wherein all parts are by weight and a)+b)+c)+d)+e)+f)+g) add up to 100.

15. An ink-jet printing ink according to claim 1.

16. A process for forming an image on a substrate comprising applying thereto a composition according to claim 1 by means of an ink-jet printer.

17. A process according to claim 16 wherein the temperature of application is in excess of 30° C.

18. A paper, an overhead projector slide or a textile material printed with a composition according to claim 1 by means of a process according to claim 1.

19. An ink-jet printer cartridge comprising a chamber and a composition wherein the composition is present in the chamber and the composition is according to claim 1.

* * * * *